United States Patent
Runge

[15] 3,697,864
[45] Oct. 10, 1972

[54] METHOD OF DETECTING GEOLOGICALLY ANOMALOUS BODIES LATERAL TO A BOREHOLE BY COMPARING ELECTRICAL RESISTIVITY MEASUREMENTS MADE USING SHORT-RANGE MEASURING MEANS AND A LONG-SPACED ELECTRODE ARRAY

[72] Inventor: Richard J. Runge, Anaheim, Calif.
[73] Assignee: Chevron Research Company, San Francisco, Calif.
[22] Filed: Nov. 16, 1970
[21] Appl. No.: 89,675

[52] U.S. Cl. .................................................. 324/10
[51] Int. Cl. .................................................. G01v 3/18
[58] Field of Search .................................. 324/10, 1

[56] References Cited

UNITED STATES PATENTS

| | | | |
|---|---|---|---|
| 3,256,480 | 1/1966 | Runge et al. | 324/10 |
| 2,141,826 | 12/1938 | Schlumberger | 324/1 |
| 2,479,518 | 8/1949 | Scherbatskoy | 324/10 X |
| 2,786,661 | 3/1957 | Herzog et al. | 324/10 X |
| 2,404,622 | 7/1946 | Doan | 324/10 |
| 2,412,363 | 12/1946 | Silverman | 324/10 X |

*Primary Examiner*—Gerard R. Strecker
*Attorney*—J. A. Buchanan, Jr., G. F. Magdeburger and R. L. Freeland, Jr.

[57] ABSTRACT

An improved method of detecting geologically anomalous bodies lateral to a borehole and determining the distance thereto utilizes a long-spaced electrode array with a current source and a current sink electrode located within the borehole. A short-spaced electrode array or other short-range electrical resistivity measuring means such as an induction log is used to obtain resistivity values for the formation surrounding the borehole. A long-spaced electrode array comprising two potential measuring electrodes, M and N, and two current electrodes, A and B, positioned within the borehole, is utilized to make resistivity measurements of the formation surrounding the borehole, said measurements reflecting the presence of electrically resistive geologically anomalous bodies located at lateral distances from the borehole up to a distance on the order of twice the spacing between the source or sink electrode and the closest potential measuring electrode. The electrodes of the long-spaced array are positioned so that B lies within the borehole and above N, N is positioned above M, M is positioned above A, and the BN distance is approximately equal to the AM distance. The short-range resistivity values are then compared with the resistivity measurements from the long-spaced electrode array, significant differences therebetween indicating the presence of an electrically resistive anomaly lateral to the borehole and the magnitude of said differences indicating the distance from the borehole to said anomaly.

6 Claims, 4 Drawing Figures

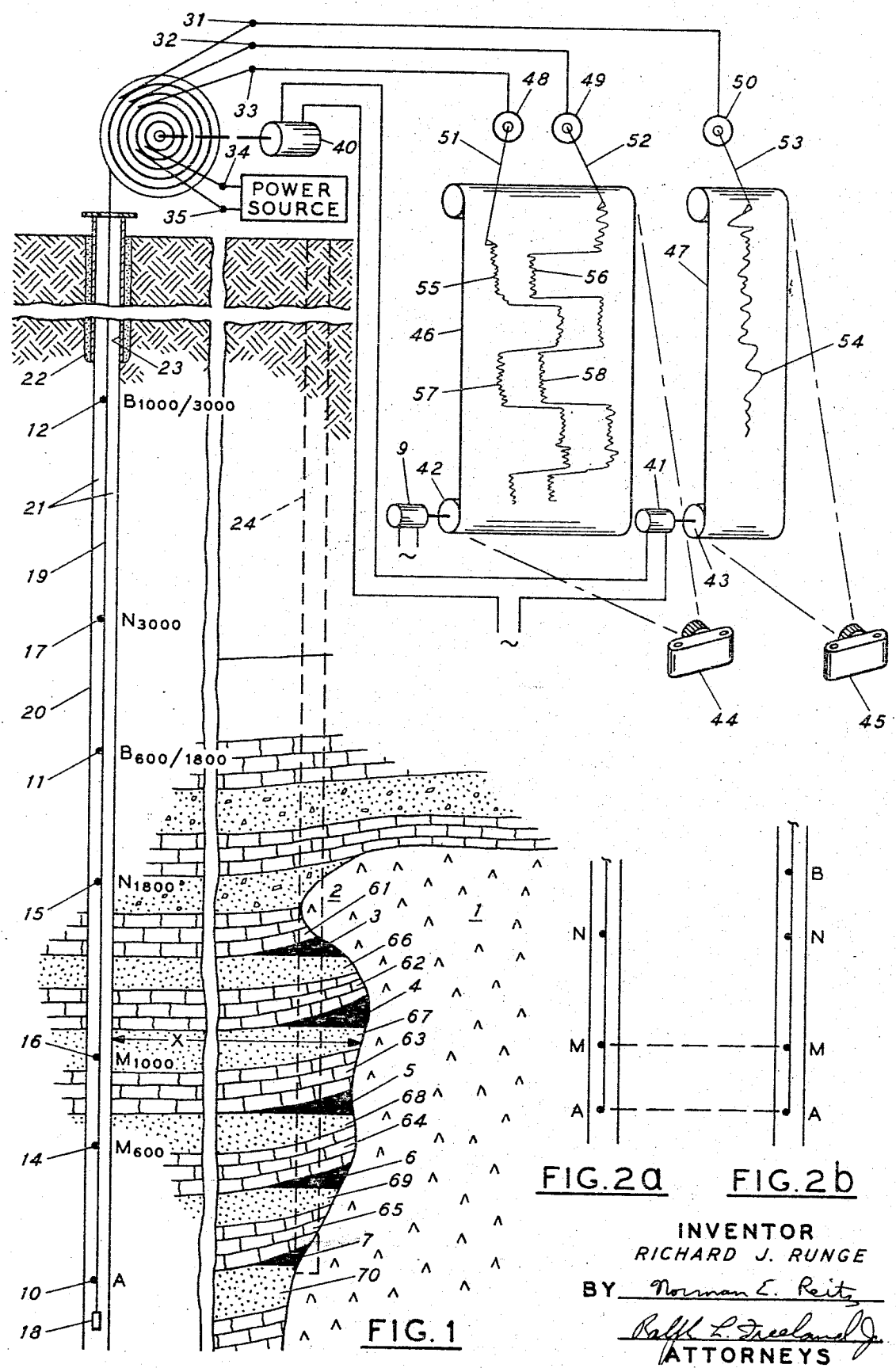

METHOD OF DETECTING GEOLOGICALLY ANOMALOUS BODIES LATERAL TO A BOREHOLE BY COMPARING ELECTRICAL RESISTIVITY MEASUREMENTS MADE USING SHORT-RANGE MEASURING MEANS AND A LONG-SPACED ELECTRODE ARRAY

My invention is related to electrical prospecting. More particularly, it is an improved method of locating the flanks of an electrically resistive geological anomaly adjacent to an exploratory borehole by comparing resistivity values obtained by short-range measuring means with the logs of long-spaced electrode arrays.

BACKGROUND OF THE INVENTION

In U.S. Pat. No. 3,256,480, Runge et al., a new method was disclosed for locating the flanks of an electrically resistive geological anomaly in the vicinity of an exploratory borehole which might be located a few feet or a few thousand feet from an electrically resistive geological anomaly. The general location of such an anomaly would be known from surface exploration but this method permitted the mapping of the flanks. Briefly, this patented method involved a comparison of logs from short-range measuring means, such as short-spaced electrode arrays, induction logs, or core samples, with logs from long-spaced electrode arrays. The short-spaced electrode array obtained values for the resistivity of the formation immediately surrounding the exploratory wellbore. The long-spaced electrode array measures the resistivity of the formation surrounding the borehole for lateral distances from the borehole up to a distance on the order of twice the spacing between the source or sink electrode and the closest potential measuring electrode. Consequently, when the logs of the two electrode arrays are compared, significant variations indicate the presence of an electrically resistive anomaly at some distance from the wellbore of the order of twice the spacing between the source or sink electrode and the closest potential measuring electrode.

The long-spaced electric logging tool commonly called ULSEL (ultra long-spaced electrode log), typically includes an electrode array, called the regular array, consisting of one current electrode, labeled A, a potential measuring electrode positioned above A, labeled M, a second potential measuring electrode positioned above M, labeled N, and a second current electrode located at or near the surface and labeled B. The spacing between A and M varies from 75 to 1,000 feet while the spacing between A and N varies between 600 and 4,000 feet. Typical spacing combinations, expressed in the form of AM/AN notations, that have been used to practice the patented method are 75/600 feet, 150/600 feet, 150/1,000 feet, 350/1,000 feet, 600/2,400 feet, 1,000/2,400 feet, and 1,000/4,000 feet. If direct current is utilized, A is the source electrode and B is the sink electrode; if alternating or pulsating current is used, then A and B are alternatively source and sink electrodes.

As described in the issued patent, the short-range resistivity values are typically obtained by running a short-spaced electrode array consisting of a single current electrode within a borehole together with 3 or 4 potential measuring electrodes spaced apart at distances of less than 20 feet, e.g., at distances of 16 inches, 64 inches and 18-⅝ feet. The short-range measurements are also often made by running an induction log in a well prior to making the long-range measurements; the induction logging tool is currently considered to be the most accurate short-spaced resistivity measuring device. Core samples and sidewall samples can also be used to obtain short-range resistivity values.

In practicing the short-range and long-spaced comparative method, it was discovered that the effective usefulness of the method was limited by shorting of the B electrode at the surface with the conductor pipe, i.e., the casing inside an exploratory borehole extending from the surface to an indeterminate depth, so that the effective position of the B electrode shifted to somewhere near the bottom of the conductor pipe. This made it difficult to correct empirically for the position of the B electrode. This also made it difficult to use the short-range and long-spaced comparative method in the borehole immediately beneath the cased portion of the wellbore. In theory, the B electrode could be positioned far from the borehole to avoid shorting with the casing but in practice, particularly in offshore logging, this is a considerable inconvenience.

When a well is in production it will be completely cased in order to protect the oil and gas from contamination as it flows to the surface. When an exploratory well is being drilled it is desirable to limit the extent of casing for the sake of economy and to limit interference with prospecting techniques. However, state and federal regulations require that even exploratory boreholes must have casing in selected portions thereof. For example, see California Public Resources Code Section 3220, which requires oil-bearing or gas-bearing strata to be cased to provide protection from water penetration and which requires strata containing ground water to be cased to provide protection against penetration by detrimental substances such as oil, gas, circulating drilling fluid or drilling debris. The Department of the Interior has promulgated regulations applicable to offshore oil-producing areas under federal jurisdiction. In some situations it is necessary to case the upper portions of exploratory wellbores to permit the installation of blowout preventors. It is also desirable to case at least the uppermost portions of an exploratory borehole in order to prevent the loss of costly circulating drilling mud into the formation surrounding the wellbore. In exploratory boreholes generally, then, it is common to find that between 200 and 1,500 feet or more of the topmost portion of the wellbore is cased. And in the Gulf Coast region of the United States, it is possible to find casing set to a depth of 3,000 feet in exploratory wells. As indicated above, this cased portion of the wellbore can adversely affect the practice of the short-range and long-spaced comparative method.

In offshore drilling, many wells are drilled from a single platform. If the B electrode is placed in the water of on the ocean floor, shorting can occur with the casing in neighboring cased wells even if an exploratory borehole is not cased.

It is therefore an object of this invention to practice the short-range and long-spaced comparative logging method in the open portion of a partially cased borehole without any shorting of a current electrode to casing in the borehole or to casing in adjacent wells.

A further object of my invention is a short-range and long-spaced comparative logging method which is effective and accurate over substantially all of the uncased portion of a partially cased wellbore.

A still further object of my invention is the development of a short-range and long-spaced comparative logging method for which no B electrode correction is required.

SUMMARY OF THE INVENTION

The improved short-range and long-spaced comparative method of my invention comprises, sequentially or simultaneously:

1. obtaining values for the resistivities of the formations surrounding the borehole by using a short-spaced electrode array or by using other conventional short-range logging methods, such as the induction log, core samples, or sidewall samples;

2. measuring the apparent resistivity of the formation surrounding the borehole by using a long-spaced electrode array consisting of two current electrodes, A and B, and two potential measuring electrodes, M and N, within the borehole positioned so that B lies within the borehole and above N, N is positioned above M, M is positioned above A, and the BN distance is approximately equal to the AM distance (this long-spaced array is hereinafter referred to as the downhole B array);

3. computing by machine processing on a digital computer the expected values of apparent resistivity for the longspaced down hold B array. The computation may be carried out by applying the theory of V. N. Dakhnov (see discussion, infra) to a model with discrete resistivity layers (called the lumped layered model) whose resistivity values are obtained by averaging the resistivities measured by the short-range resistivity measuring means. Or the computation may be carried out by averaging the conductivities measured by the induction log, the averages being taken over distances equal to or greater than the long electrode spacings, and then reciprocating the average conductivity to indicate the expected apparent resistivity for the downhole B array; and 4. comparing the expected long-spaced apparent resistivities obtained as indicated in (3) with the actually measured resistivities obtained by the ultra long-spaced downhole B array.

If there is a significant difference between the computed resistivities obtained by the short-range means and the actually measured resistivities obtained by the ultra long-spaced downhole B array, the difference indicates that the formations surrounding the borehole are not effectively uniform in resistivity to an unlimited horizontal extent. In particular, if the resistivity measured by the ultra long-spaced downhole B array is larger than the computed resistivity obtained by the short-range means, it may be concluded that the formations surrounding the wellbore are interrupted by a body of relatively higher resistivity within some horizontal distance from the borehole that is less than or of the order of twice the spacing between the source or sink electrode and the closest potential measuring electrode in the ultra long-spaced, downhole B array.

In striving to avoid the conduction effects of partially cased boreholes by placing both current electrodes downhole, it has been found that the configuration of my present invention possesses several unexpected advantages over the ultra long-spaced method utilizing the regular array. To show these advantages it is necessary to compare the downhole B array with the equivalent regular array, a regular array in which the AM and AN spacings are equal, respectively, to the AM and AN spacings of the downhole B array. The difference in the potential measured by the M and the N electrodes for either array for the case of a plane resistive anomaly parallel to the borehole in a homogeneous medium is given by $$V_M - V_N = (\rho I/4\pi)(G + I(x))$$

where $G$ is the geometric factor of the tool; $\rho$ is the actual resistivity of the formations surrounding the borehole; $I$ is the current; and $I(x)$ is proportional to the contribution to the measured potential due to current reflected from the plane resistive anomaly parallel to the borehole and a distance $x$ from the borehole (commonly called the image contribution). For the regular array the geometric factor is given by $$G_R = 1/AM - 1/AN, \text{ and } I_R(x) = 1/\sqrt{(AM)^2 + 4x^2} - 1/\sqrt{(AN)^2 + 4x^2}$$

It can similarly be shown that for the downhole B array, the geometric factor is given by $$G_B = 1/AM - 1/AN + 1/BN - 1/BM = 2/AM - 2/AN = 2G_R$$

and that since AM = BN and AN = BM for the downhole B array, we have in the case of a plane resistive anomaly parallel to the borehole and located a distance $x$ from the borehole $I_B(x) = 1/\sqrt{(BN)^2 + 4x^2} - 1/\sqrt{(AN)^2 + 4x^2} + 1/\sqrt{(AM)^2 + 4x^2} - 1/\sqrt{(BM)^2 + 4x^2} = 2I_R(x)$ Therefore, it is evident that the potential difference measured between the $M$ and $N$ electrodes in the case of the downhole $B$ electrode array is twice that of the equivalent regular array. As a result, the signal-to-noise ratio is doubled and the sensitivity of the instrument, especially in low voltage situations, is enhanced.

Throughout the above description wherever reference is made to measuring the resistivity, it is permissible to measure and use conductivities in the computation if one keeps in mind that there is a mutual reciprocal relationship between resistivity and conductivity and performs the averaging in a mathematically correct manner.

In utilizing the resistivities measured by a short-spaced electrode array or by other short-range measuring means to obtain a predicted apparent resistivity value for the long-spaced downhole $B$ array, it is important to carry out the calculations in a mathematically precise manner and to take into consideration the overall anisotropy of the earth caused both by the heterogeneous layering of beds of different resistivities and by the microscopic anisotropy of the individual, otherwise homogeneous beds. These two requirements are met by employing a special version of the simple first-order theory traditionally used to interpret the results of electric logging. The first-order theory used in the present invention employs a geophysical model in which the actual, random, heterogeneous and anisotropic conducting earth is replaced, to a first order, by a homogeneous medium whose conductivity components, both vertical and horizontal, are simple arithmetic averages of the corresponding conductivity components of the actual earth. In this first-order theory the potential at a point due to a source of current at another point can be calculated by using the formula for the electric potential due to a point current source in a homogeneous anisotropic medium.

An additional simplification is incorporated into the first-order theory employed in my present invention by assuming that (except for the presence of the large structure being prospected for) the lateral variation of electrical parameters is negligible, hence, the utilization of the conductivity components is carried out through consideration of their vertical variation alone. It will be assumed in the following that only a vertical variation is of significance and that no significant lateral or azimuthal variation in electrical parameters exists.

Thus, within the framework of this first-order theory, the necessary quantities needed to obtain the potential at a point (and hence the potential difference between two points) are (a) the geometrical coordinates of the point involved; (b) the total electric current leaving the point source; (c) the average horizontal conductivity, $\bar{\sigma}_H$ (taken in vertical variation), and (d) the average vertical resistivity, $\bar{\rho}_V$ (taken in vertical variation).

In using this version of the first-order theory to interpret long-spaced potential difference measurements, a difficulty arises in connection with evaluating the average vertical resistivity, $\bar{\rho}_V$. The paradox of anisotropy states that in an anisotropic medium with vertical and lateral components of resistivity, measurements of potential differences in a vertical borehole for the case of a point source within the borehole (neglecting the borehole itself) will suffice only to determine the lateral or horizontal resistivity and will not render a value for the vertical resistivity. And conventional short-range electric logging methods, generally speaking, measure either $\sigma_H$ or $\rho_H$ and not $\rho_V$. Likewise, the induction log measures only a horizontal component of the local conductivity, $\sigma_H$. To overcome this problem, the local anisotropy, i.e., the anisotropy of sediments at depth $z$, $\lambda(z)$, can be estimated from information obtained from cores, sidewall samples, and well logs run in the same well or in adjacent wells. In such cases, $\rho_V$ can be directly obtained from $\rho_H$ or $\sigma_H$ because $\rho_H = 1/\sigma_H$ and $\lambda^2 = \rho_V$ divided by $\rho_H$.

BRIEF DESCRIPTION OF THE DRAWINGS

Further objects and advantages of the present invention will become apparent by reference to the drawings which are hereby incorporated into the specification and in which:

FIG. 1 is a pictorial illustration of several embodiments of the long-spaced downhole B electrode array of my improved method of exploring laterally for electrically resistive geologically anomalous bodies. Both current electrodes, A and B, are shown to be placed downhole and the potentials measured when a pulsating source current is used are shown. An induction log is shown to be attached to the long-spaced downhole B array even though the induction log may be run separately and often is run prior to the long-spaced logging runs.

FIG. 2-a is an illustration of the configuration of the long-spaced electrode array of the original short-range and long-spaced comparative logging method.

FIG. 2-b is an illustration of the configuration of the downhole B array. The AM and AN spacings are shown to be identical to the AM and AN spacings of the regular long-spaced array of FIG. 2-a. When this identity occurs, the regular array is defined to be the equivalent regular array.

Referring now to FIG. 1 of the drawings, exploratory borehole 20 is seen to be uncased over most of its length. Near the surface, however, conductor pipe 23 has been fixed in place by cement 22 in order to protect ground water from contamination and to prevent the loss of costly drilling mud. Logging cable 19 has been inserted into borehole 20 and is capable of being operated continuously by motor 40. Current electrodes 10, 11, and 12 and potential measuring electrodes 14, 15, 16, and 17 are affixed externally to logging cable 19. In another embodiment of my invention, the electrodes are attached to a drill-string so that the logging is conducted while the exploratory wellbore is being drilled.

Two embodiments of my invention are shown in FIG. 1. In the first embodiment, electrode 10 represents the A current electrode; electrode 14 represents the bottommost potential measuring electrode, M; electrode 15 represents the topmost potential measuring electrode, N; and electrode 11 represents the B current electrode. In this embodiment, the electrode spacings, drawn to scale, are AM = 600 feet; AN = 1,800 feet; and AB = 2,400 feet. In the second embodiment, electrode 10 represents the A current electrode; electrode 16 represents the bottommost potential measuring electrode, M; electrode 17 represents the topmost potential measuring electrode, N; and electrode 12 represents the B current electrode. In this embodiment, the electrode spacings, drawn to scale, are AM = 1,000 feet; AN = 3,000 feet; and AB = 4,000 feet. As shown in FIG. 1, all electrodes are in contact with electrically conductive borehole fluid 21 so that electrical contact with the formation is maintained. As a result, no corrections are required to take into account the interface between the conductive borehole fluid and the formations. The long-spaced resistivity measurements can be made using either alternating, pulsating, or direct current. Current electrodes 10 and 11 or 10 and 12 are connected via logging cable 19 to terminals 34 and 35, respectively, of a power source which supplies the current. If alternating or pulsating current is used the A and B electrodes alternately become source and sink electrodes. If direct current is used, either A or B can be the source electrode while the other electrode will be the sink electrode. The optimum frequency of the current to be used with the ultra long-spaced downhole B array is not the same under all conditions. It has been found that a frequency on the order of 1 cycle per second is reasonable to use for shorter arrays with AM = 75 or 150 feet, but lower frequencies, such as 1/20 cycle per second, should then be used for the larger arrays with AM = 600 feet, AN = 2,400 feet; or AM =

Figure 3:
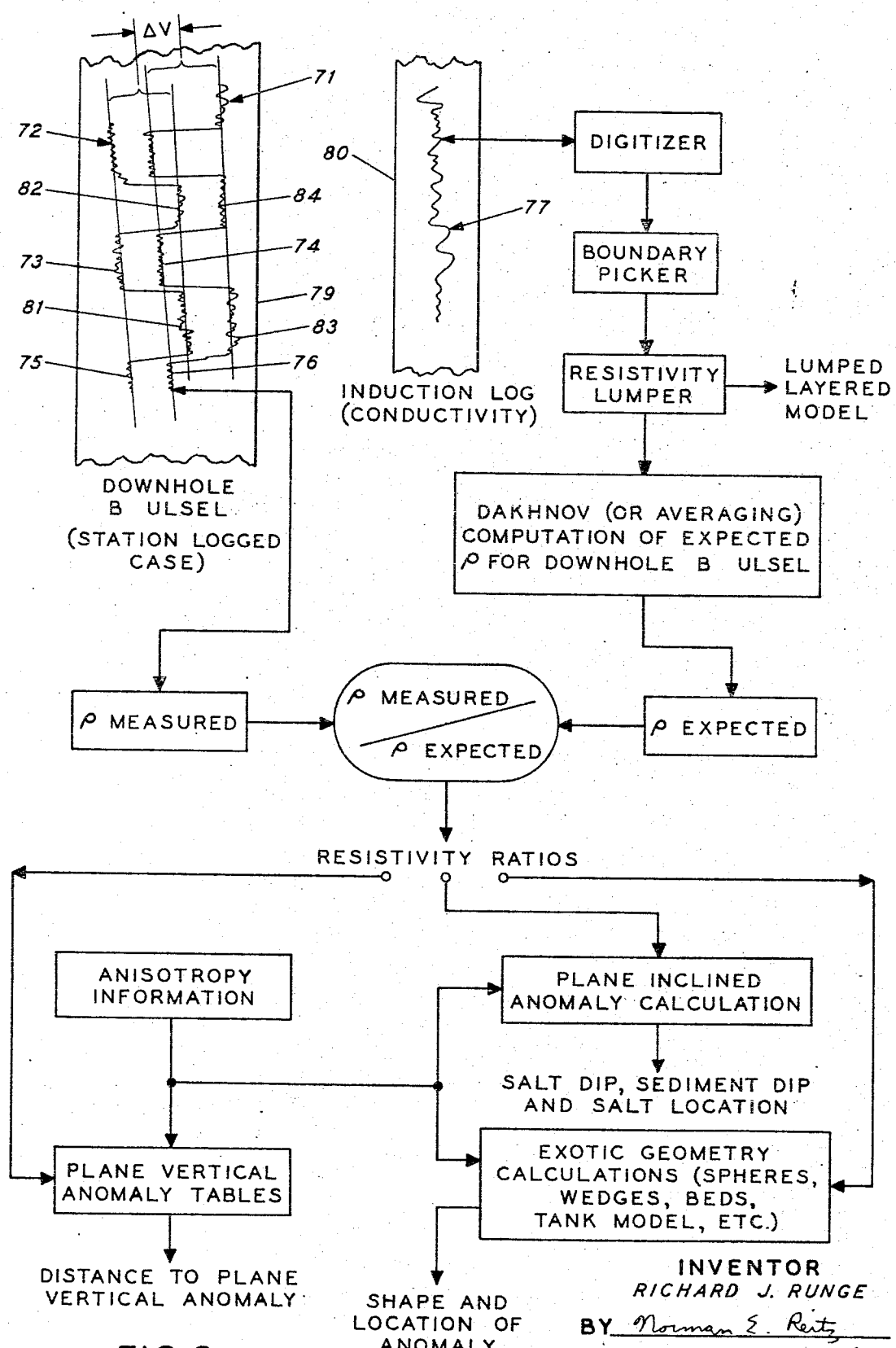
FIG. 3 is a flow diagram which depicts the method of my improved invention. The measured and expected resistivities are compared to determine the distance to the anomaly or other information such as anomaly dip or sediment dip.

1,000 feet, $AN = 3,000$ feet. In practice, a pulsating current has been found to be preferable. Since pulsating current is used, the longer downhole $B$ tools are station logged. The skin effect on the electrodes would be too severe if the pulsations were rapid enough to permit continuous logging. Station logging is also desirable because the downhole $B$ signal is in the microvolt range for the longer tools, while there is a large spontaneous potential which must be bucked out. For shorter tools, e.g., for $AM = 75$ feet, $AN = 600$ feet; and $AM = 150$ feet, $AN = 600$ or $1,000$ feet, the skin effect is less severe and the downhole $B$ signal is larger because the $M$ electrode is closer to the $A$ electrode and the $N$ electrode is closer to the $B$ electrode. Thus, the shorter tools can be and are logged continuously.

Exploratory borehole 20 is shown to have missed oil pools 3, 4, 5, 6, and 7, which have accumulated in the natural traps formed by upturned impervious layers 62, 63, 64, and 65, and the side of the salt dome 1, and by impervious layer 61 and salt overhang 2. The oil in these pools was originally dispersed throughout porous layers 66, 67, 68, 69, and 70, but gradually migrated to form these pools because the specific gravity of oil is less than the specific gravity of the water in the porous formations. It is desirable, then, to determine the distance, $x$, from the borehole to the salt dome so that well 24 can be drilled to recover the oil. As recited above, these distances can be determined by comparing the logs of short-range resistivity measurements to the log of the downhole B electrode array.

Referring again to FIG. 1, for the use of the station logged downhole $B$ array utilizing pulsating current, the voltage measured between the potential measuring electrodes 14 and 15 of the 600/1,800 foot tool (expressed in $AM/AN$ notation) is transmitted via logging cable 19 to terminal 33 and thence to galvanometer 48. A record of this voltage difference versus time is then made on chart 46 by means of galvanometer pen 51. Similarly, the voltage measured between the potential measuring electrodes, 16 and 17, of the 1,000/3,000 foot tool is transmitted via logging cable 19 to terminal 32 and thence to galvanometer 49. This second voltage difference is then recorded versus time adjacent to the trace from the 600/1,800 foot tool by means of galvanometer pen 52. Chart 46 is driven by motor 9 which operates chart roller 42 whenever station logging is underway. $A$-electrode logging station depth marks can be placed on chart 46 to indicate the depth for which a given voltage difference (corresponding to an apparent resistivity value) is valid. As recited above, this station logging technique is used for longer tools to avoid the skin effect and to facilitate bucking out the spontaneous potential. For shorter tools a continuous log of the potential difference is maintained as a function of depth.

Induction log 18 can be run at the same time as the long-spaced logging measurements are being made. The induction log, however, is often run as a part of a conventional spontaneous potential logging run which is conducted prior to the long-spaced run. In FIG. 1 the signal from induction log 18 is transmitted via logging cable 19 to terminal 31 and thence to galvanometer 50. A record of the conductivity, trace 54, is then made on chart 47 by means of galvanometer pen 53. Conductivity trace 54 is recorded as a function of depth since chart roller 43 is driven by chart motor 41 which is synchronized with logging cable motor 40.

Continuous photographic records of the voltage differences recorded on chart 46 and of conductivity trace 54 on chart 47 are made by cameras 44 and 45, respectively. These photographic records are shown in FIG. 3 as charts 79 and 80, respectively, and are used as data for the calculation of the ratio of the measured resistivity to the expected resistivity.

The flow diagram of FIG. 3 illustrates an embodiment for determining either the distance to an anomaly or other information about the shape and position of an anomaly. The potential differences between the $M$ and $N$ electrodes of the 600/1,800 foot tool and the 1,000/3,000 foot tool, obtained as shown in FIG. 2, are displayed as traces 72 and 71. Since a pulsating current was used in the embodiment of FIG. 1, the potential differences displayed in FIG. 3 have a changing polarity. Lines are drawn through the constant polarity portions of each potential difference curve, e.g., through portions 73 and 75 of trace 72, through portions 74 and 76 of trace 71, through portions 81 and 82 of trace 72 and through portions 83 and 84 of trace 71. The distance between these constant polarity lines is then used to determine apparent resistivity as a function of depth by reference to the calibration data for the two tools. The calibration data relates average interline distance to ohm meters so that the measured apparent resistivity can be compared with the expected resistivity in the embodiments wherein $AM$ values are less than 200 feet, continuous logging of the measured resistivity vs. depth is done and the resistivity is indicated directly on log.

Conductivity trace 77 (corresponding to conductivity trace 54 of FIG. 1) is scanned by an optical digitizer which digitizes conductivity values. Typically, selected depth values are picked using a computerized automatic bed boundary picking scheme. Different criteria may be used in this picking of bed boundaries on trace 77. Conductivity values between the picked depth values are arithmetically averaged and then reciprocated to yield lumped resistivity values for those selected intervals which in turn are used to construct a resistivity model of the section which has been logged. Such a model, called a lumped layered resistivity model, could contain several hundred discrete layers. Each layer is assigned a resistivity value. As described infra, a rigorous potential theory developed by V. N. Kakhnov (see Theory of Apparent Resistivity, Quarterly of the Colorado School of Mines, vol. 57, no. 2, pages 131 ff.) can be applied to the lumped layered model to determine the resistivity that the long-spaced downhole $B$ array would be expected to measure in the absence of any anomaly lateral to the borehole. Alternatively, a straight forward, but very approximate, arithmetic averaging technique can be applied to the induction log conductivity values to obtain the resistivity that the downhole $B$ array would be expected to measure.

A simple analog divider is used to compute the ratio of the measured resistivity to the computed resistivity that the downhole $B$ array is expected to measure. These ratios do not explicitly provide a measure of the distance to the anomaly. However, the resistivity of the anomaly, e.g., the apparent resistivity due to the effect of a plane parallel salt flank is known. This knowledge, together with the known resistivity of the sedimentary layers, can be used to prepare a table of resistivity ratios versus lateral distances if it is assumed that the anomaly is parallel to the borehole and is infinite in extent as it extends away from the flank adjacent to the anomaly. Tables of apparent resistivity ratios vs. distance to a plane parallel salt flank are prepared for each tool. In one embodiment of my invention, the lateral distances are determined by utilizing a digital computer with a computer program employing a one-dimensional search technique which searches all possible values of $x$ to determine which value would create the measured ratio, given the configuration of the tool used and the resistivity of the anomaly in question. Additional self-iterating computer programs can be written to operate on a digital computer to provide information on an anomaly adjacent to the borehole if the apparent resistivity ratio is known. Some of these procedures are also diagrammed in FIG. 3. For example, if the anomaly is known for some reason to have a particular configuration, e.g., a wedge, sphere, inclined flank, or other exotic geometry, certain parameters, such as flank inclination, wedge angle, or boundary location, can be resolved. The resolution is carried out in the computer program by repeatedly testing values for the relevant parameters to see if a given value would produce the set of measured resistivity ratios. The theoretical computer programs have been demonstrated to accurately determine these parameters in test runs in an electrolytic tank in which a scaled-down downhole $B$ tool and variously shaped anomalies have been placed. The algorithms employed in these computer programs are discussed infra.

As discussed in the specification of the original ultra long-spaced electrode patent, U.S. Pat. No. 3,256,480, the relationship between the apparent resistivity and the actual distance to the plane resistive salt anomaly parallel to the borehole in an essentially homogenous medium is given by $$\rho_s/\rho = (G_R + I_R(x))/G_R$$

where

| | |
|---|---|
| $\rho_s$ | is the apparent resistivity measured in the presence of salt; |
| $\rho$ | is the apparent resistivity from the first-order theory which would be measured in the absence of salt, or $1/\bar{\sigma}_H$; |
| $x$ | is the apparent distance from the borehole to the plane parallel salt face; |
| $X_0$ | is the actual distance between the borehole and salt face and equals $X\lambda_T$, where $\lambda_T$ is the total electrical anisotropy of the medium; |
| $G_R$ | is the geometric factor of the regular array = $1/AM - 1/AN$; |
| $I_R(x)$ | is the image contribtuion, |

$$I_R(x) = 1/\sqrt{(AM)^2 + 4x^2} - 1/\sqrt{(AN)^2 + 4x^2}$$

of the regular array.
For the downhole B array, equation (1) is replaced by $$\rho_s/\rho = (G_B + I_B(x))/G_B$$

where it can be proved that $G_B$ and $I_B(x)$ are given by $G_B = 2G_R$, and $I_B(x) = 2I_R(x)$, if all other quantities are the same. We thus see that the $\rho_s/\rho$ ratio is the same for both the downhole $B$ array and the equivalent regular array.

If the salt is located far enough from the borehole so that it exerts no effect on the short-range resistivity measurements but affects the ultra long-spaced downhole $B$ array resistivity measurements, then from the ratio of resistivities interpreted with the aid of equation (2), it is possible to estimate the distance to the salt flank within the uncertainty in measuring $\lambda_T$. It has been established that the microanisotropy is unlikely to exceed 2 even in highly anisotropic beds, such as shales (see, for instance, Kuntz and Moran, Geophysics, v. 23, pp. 770–794, 1958). Furthermore, it is possible to calculate precisely the anisotropic contribution arising from the heterogeneous layering of beds of different $\sigma_H$. Consequently, $\lambda_T$ can be estimated within an accuracy of 50 percent without extensive information beyond that available directly from the log of the ultra long-spaced downhole $B$ array and the induction log. Even in the more extreme case where $\lambda_T$ is known with an accuracy no better than a factor of 2, $X_0$ is then known to within the same factor. While such an uncertainty might render some logging measurements of little value, in this special case knowledge of the distance of the salt within a factor of 2 is more than adequate. For instance, if the salt flank is calculated to be 100 feet away, it does not matter much whether it is 50 feet or 200 feet, since in neither case is there an opportunity for a commercially significant oil accumulation to lie between the dry borehole and the salt flank. On the other hand, a determination that the salt is 1,000 feet away, with an uncertainty of 2, would warrant further exploration or drilling. Thus, even in the case of extreme uncertainty of $\lambda_T$, the method of my present invention can be applied to produce a commercially useful result.

The method of the present invention has been found to be slightly more useful in locating massive vertically shaped anomalies than the equivalent regular array. For a horizontally disposed anomaly located below the $A$ electrode in a homogeneous medium it can be shown that the ratio of the apparent resistivity measured by the downhole $B$ array, $\rho_{AB}$, to the actual resistivity of the formation, $\rho$, satisfies the inequality $(\rho_{AB}/\rho_{HOR}) \leq 1.5$, while the ratio of the apparent resistivity measured by the equivalent regular array, $\rho_{AR}$, to the actual resistivity of the formations, $\rho$, is given by $(\rho_{AR}/\rho)_{HOR} \leq 2.0$. This indicates that the downhole $B$ array is somewhat less sensitive to horizontally disposed anomalies, other things being equal, than the equivalent regular array. Thus, when it is desired to locate massive vertical anomalies, the method of the present invention is preferably to the original method employing the regular array. Nevertheless, an additional, although apparently contradictory, advantage is reaped in cases where salt overhangs occur near the wellbore. In this situation, the $B$ electrode is near the irregularity in the contour of the anomaly and therefore the response of the tool is sensitive to its presence. This peculiar sensitivity is analogous to the sensitivity of the $A$ electrode to salt underhangs, i.e., the sensitivity of the regular array to salt underhangs. In these situations, the effect of the proximity of the current electrode to the irregularity in the contour of the flank of the anomaly is greater the lessened sensitivity due to the fact that the irregularity is partially horizontally disposed.

Although the above example of the practice of the method of my present invention pertains to a salt dome, the invention can also be used to identify other bodies having a high resistivity contrast. Among the rock formations that have similar high resistivity contrasts to surrounding earth formations are anhydrites, carbonates, and igneous rocks. The method of my invention is also useful to detect geological structures such as faults that are sealed by minerals which have high resistivities and thin, but highly resistive, oil sands which cover large areas but do not intersect the exploratory borehole can be detected by the downhole B array.

I claim:

1. A method of prospecting for electrically resistive anomalies lateral to, and not cut by, a borehole which avoids the introduction of error effects due to partial casing of the upper portion of said borehole comprising:

measuring a first electrical characteristic representative of the resistivity of formations cut by and surrounding the borehole with short-range logging means over a given depth interval below the cased portion of said borehole;

measuring the apparent resistivity of the formations surrounding the borehole including any resistivity anomalies lateral to and not cut by said borehole over said given depth interval with a long-spaced electric logging array consisting of two current electrodes, A and B, and two potential measuring electrodes, M and N, positioned so that B is within said borehole and lies both below said cased portion thereof and above N, N is positioned above M, M is positioned above A, and the BN distance is approximately equal to the AM distance;

obtaining expected long-spaced apparent resistivity values over said given depth interval for spacings equal to the distance between electrodes M and N from said first electrical characteristic values by machine processing said measured first electrical characteristic values with a digital computer programmed to average said values over said distance by a program selected from the group consisting of the Dakhnov algorithm and a distance averaging algorithm;

comparing expected apparent resistivity values with the apparent resistivity values measured by said long-spaced electric logging array, a significant disparity indicating that an electrically resistive anomaly that is not cut by said borehole lies at a lateral distance from the borehole, said distance being determined by the following formula:

$$\rho_s/\rho = (G_B + I_B(x))/G_B$$

where $\rho_s$ is the apparent resistivity measured in the presence of a resistive anomaly;

$\rho$       is the apparent resistivity expected if no resistive anomaly is present;

$x$       is the apparent distance from the borehole to the flank of the anomaly;

$G_B$     is the geometric factor of the long-spaced electrode array $= 2/AM - 2/AN$ $I_B(x)$   is the image term for the long-spaced electrode array $= 2/\sqrt{(AM)^2 + 4x^2} - 2/\sqrt{(AN)^2 + 4x^2}$ 2. The method of claim 1 in which said first electrical characteristic is resistivity and said short-range logging means is a short-spaced electrode array which has the potential measuring electrodes positioned less than 25 feet apart and in which said long-spaced electrode array has distances between said AM and BN of at least 75 feet, and in which the AN and BM distances are more than twice said AM and BN distances.

3. The method of claim 1 in which said first electrical characteristic is conductivity and said short-rage logging means is an induction logging tool and in which said long-spaced electrode array has distances between said AM and BN distances of at least 75 feet, and in which the AN and BM distances are more than twice said AM and BN distances.

4. In a method for exploring for salt domes or other electrically resistive bodies lateral to and not intercepted by a borehole, said borehole being partially cased with an electrically conductive casing in its upper portion, which comprises the steps of measuring a first electrical characteristic of the formation directly surrounding and intercepted by the borehole with short-range logging means over a given depth interval in said borehole below said conductive casing, measuring over the same depth interval the apparent resistivity of the formations surrounding the borehole including formations not intercepted by said borehole, with long-spaced electric logging means, obtaining expected long-spaced apparent resistivity values from said first electrical characteristic values by machine processing said first electrical characteristic values with a digital computer programmed to average said values over said given depth interval including the Dakhnov algorithm and a distance averaging algorithm, and comparing the computed apparent resistivity for at least a part of said given depth interval with the apparent resistivity measured by the long-spaced electric logging means for the same part of said interval, a significant disparity therebetween indicating that an electrically resistive anomaly lies at some lateral distance from the borehole less than the distance between the source electrode and the nearest potential measuring electrode, the improvement comprising utilizing a long-spaced electrode array consisting of two current electrodes, A and B, and two potential measuring electrodes, M and N, positioned so that B is within said borehole and lies below said electrically conductive casing and above N, N is positioned above M, M is positioned above A, and the BN distance is approximately equal to the AM distance.

5. The method of claim 4 in which said first electrical characteristic is resistivity and said short-range logging means is a short-spaced electrode array which has the potential measuring electrodes positioned less than 25 feet apart and in which said long-spaced electrode array has said distances between AM and BN of at least 75 feet, and in which the AN and BM distances are more than twice said AM and BN distances.

6. The method of claim 4 in which said first electrical characteristic is conductivity and said short-range logging means is an induction logging tool and in which said long-spaced electrode array has distances between said AM and BN of at least 75 feet, and in which the AN and BM distances are more than twice said AM and BN distances.

* * * * *